United States Patent
Hearns et al.

[15] 3,649,145
[45] Mar. 14, 1972

[54] FILM WIDTH CONTROLLER

[72] Inventors: Harold L. Hearns; Raymond D. Behr, both of Midland, Mich.

[73] Assignee: The Dow Chemical Company, Midland, Mich.

[22] Filed: Apr. 10, 1969

[21] Appl. No.: 815,157

[52] U.S. Cl..............................425/140, 425/326, 425/172
[51] Int. Cl..............................................................B29d 7/02
[58] Field of Search..........................18/2 F, 2 I, 14 S, 2 HA; 251/205; 137/83

[56] References Cited

UNITED STATES PATENTS

| 957,469 | 5/1910 | Mackerey | 251/205 |
| 1,065,494 | 6/1913 | Anderson | 251/205 |
| 2,188,234 | 1/1940 | Schwenn | 251/205 X |
| 2,529,897 | 11/1950 | Bailey | 18/14 S |
| 2,764,995 | 10/1956 | Krupp | 251/205 X |
| 3,513,501 | 5/1970 | Hearns | 18/14 M X |

Primary Examiner—Robert D. Baldwin
Assistant Examiner—Norman E. Lehrer
Attorney—Griswold & Burdick, B. M. Halldorson and R. G. Waterman

[57] ABSTRACT

A device for automatically controlling and correcting the size of film produced by what is generally designated as the "bubble" process. The device basically comprises a flow block plate valve mechanism which blocks, partially blocks, or permits free flow of air into the bubble responsive to the movement of opposed film edge followers sensing film width deviations. The edge followers operate without the need for a fixed reference point, and by employing pneumatic means whereby contact and bruising of the film edges by such followers is avoided.

1 Claim, 8 Drawing Figures

Patented March 14, 1972

INVENTORS.
Harold L. Hearns
BY Raymond D. Behr

Burke N. Halloran
ATTORNEY

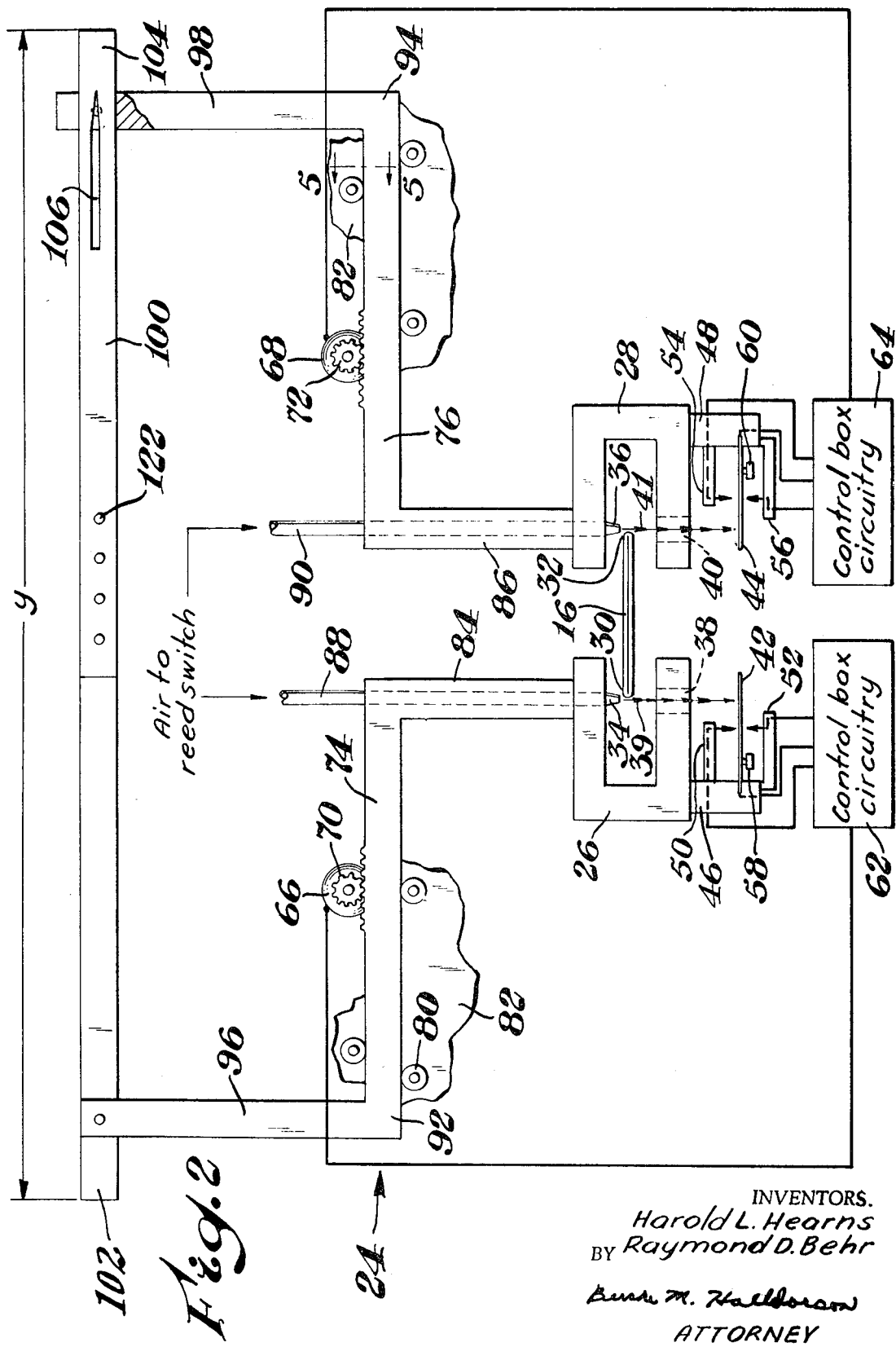

FILM WIDTH CONTROLLER

BACKGROUND OF THE INVENTION

1. Field of the Invention

This invention relates to the manufacture and processing of webs such as plastic film, sheet and the like, and, more particularly, to means for continuously measuring and correcting the width of moving film produced by the so-called "bubble" process.

2. Description of the Prior Art

In the production of continuous webs, such as by the bubble process, it is well known that in order to maintain a high rate of quality production, it is necessary, among other things, to maintain and control the width of the continuous traveling film. The measuring of the film, sheet or web or positioning same with the use of edge guides has proved to be unsatisfactory. This is so especially where the film is thin and easily crumpled or torn as it contacts the edge guide. Automatic means to measure film or web width using a fixed reference have also been found to have serious shortcomings. Among these is the difficulty of measuring film width during "the run" because of the lateral sway of the moving film. In order to measure such width or to position the film as it travels and to do it quickly, efficiently and without clogging, it is most desirable to employ controlling means which require neither a fixed reference nor edge guide control.

The valve mechanism feeding air internally into the bubble can be made responsive to such followers, edge guides, and the like detecting deviations in film width. Such valves must operate accurately and with reasonably fast response if optimum film size control is to be obtained. Normally such prior art valve devices are complex and for that reason can be unreliable. Breakdowns oftentimes require the attention of skilled technical personnel, and the profuse number of parts, electronic and mechanical, that are associated with the more complicated of such devices, if not kept in stock, can result in costly delays during the period between part failure and procurement. Most desirably, the device is made operable in both directions (i.e., a two-way valve) whereby corrections corresponding to either an increase or decrease in bubble size can be rapidly and efficiently effected.

It is an object of the present invention, therefore, to provide an improved, generally uncomplicated and low-cost valve mechanism useful in controlling the size of film produced by the bubble or like processes.

It is a further object of this invention to provide such a device in combination with width measuring and controlling means for the manufacture of moving films.

A further object of this invention is to provide such measurements and control without the use of a fixed reference and without an edge guide control.

Still a further object of the invention is to provide apparatus that can efficiently and quickly measure the width of traveling film irrespective of lateral film sway.

SUMMARY OF THE INVENTION

Briefly then, the present invention concerns a device for automatically controlling the width of moving film manufactured by the bubble process. Such a device can include first and second movable film edge followers and a valve mechanism comprising a flow block plate fixed at one end to the first follower, and at its other end, or valving end, slidably carried by the second follower in a gap associated with a forked region or end thereof. Air pressure means (feeding the bubble) connect to the opposite faces of the forked end, respectively, whereby an airstream under pressure is caused to flow across the gap. The flow block plate includes an aperture slidably alignable to various degrees with the airstream crossing the gap, responsive to changes in the spacing between the two followers, whereby the stream is blocked, partially blocked, or permitted to flow freely across the gap. For example, any increase in spacing between such followers (film too wide) occasions a greater blocking or partial blocking effect on airflow to the bubble, thereby automatically reducing or correcting bubble size.

A preferred embodiment of the invention is shown in the accompanying drawings, wherein:

FIG. 2 is a schematic and diagrammatic representation with parts broken away of the width measuring and controlling device of FIG. 1.

DESCRIPTION OF THE PREFERRED EMBODIMENT

Figure 1:
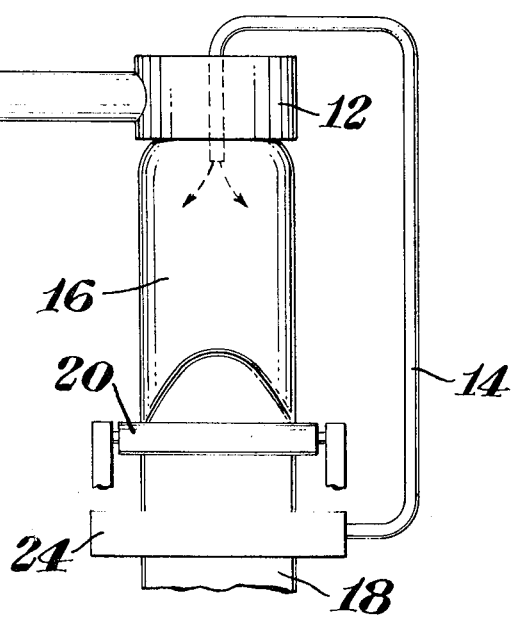
FIG. 1 is a schematic and diagrammatic representation of the "air bubble" process of film extrusion wherein the same is provided with a width measuring and controlling device constructed according to the principles of the present invention.

Looking now with more particularity at the drawings, FIG. 1 shows schematically an arrangement for the continuous automatic control of film which is tubularly extruded. A film source or extruder 10 receives the polymeric material, heat plastifies it, and extrudes it tubularly through annular die 12 with the aid of air pressure through tubing 14. The extruded film emerges as a tubular envelope or bubble 16, the width of which is ultimately governed by the amount of air allowed to enter the extruder 10 via tubing 14. The tubular envelope 16 is flattened by roller system 20 and assumes configuration 18. At this stage it is ready to be acted upon by the film width controlling device denoted in FIG. 1 at 24, and which connects into tubing 14 feeding air to the tubular envelope.

FIG. 2 shows regulator device 24 in detail wherein film 16 is shown as a flattened tube passing between first and second moveable, U-shaped edge followers 26 and 28. Trained above and just outside edges 30 and 32 of film 16, and comprising a part of followers 26 and 28, respectively, are nozzles 34 and 36. Opposite nozzles 34 and 36, and beneath film edges 30 and 32, followers 26 and 28 define apertures or openings 38 and 40. Nozzles 34 and 36 direct air jets 39 and 41 from a first constant pressure source (not shown), through apertures 38 and 40, to operate, by means of impinging airflow, reed-type switches 42 and 44. Reeds 42 and 44 are cantileverly mounted for bendable movement in support members 46 and 48, respectively, which, in turn, are fixedly associated with the underparts of followers 26 and 28, respectively. Attached to members 46 and 48, and disposed above and below reed switches 42 and 44, respectively, are upper and lower contact means 50 and 52, and 54 and 56. Setscrews 58 and 60 bias reed switches 42 and 44 upwardly toward upper contact means 50 and 54, and are fixedly connected to members 46 and 48 by suitable means (not shown).

Figure 4:
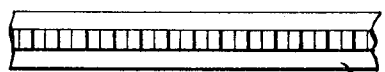
FIG. 4 is a fragmentary enlarged top view of the track construction which assists lateral movement of the follower portion of the device of FIG. 2.
Figure 5:
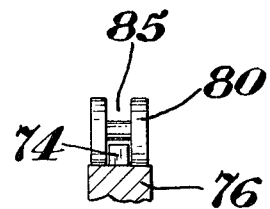
FIG. 5 is a fragmentary enlarged cross-sectional view taken along reference line 5—5 of FIG. 2 and showing a related part of the track construction shown in FIG. 4.

Reed switches 42 and 44, responsive to the rate of flow of jets 39 and 41, activate electronic control boxes 62 and 64. Control boxes 62 and 64, in turn, power servomotors 66 and 68, respectively, which drive pinion gears 70 and 72. Pinion gears 70 and 72 operate horizontally disposed rack gears 74 and 76, respectively, which are mounted for lateral movement on a fixed roller system 80. Rollers 80 are rotatably mounted in a stationary frame or other suitable housing or support as denoted generally at 82. To permit wide lateral range, rack gears 74 and 76 are constructed with a center raised geared portion 74 which rides in a groove 85 of the topside disposed rollers 80, as best shown in FIGS. 4 and 5.

The movement of rack gears 74 and 76 is transferred to edge followers 26 and 28, respectively, by vertical supports 84 and 86 which fixedly connect the rack gears to the edge followers. Vertical supports 84 and 86 are hollowed to receive tubing lines 88 and 90 which provide the connection between the aforesaid first constant pressure source (not shown) and nozzles 34 and 36.

Rack gears 74 and 76, at their ends 92 and 94 located opposite edge followers 26 and 28, connect to vertically positioned arms 96 and 98, respectively. A horizontally disposed crossbar, hereinafter referred to as a flow block plate or means 100, is pivotally attached at one of its ends 102 to arm 96, and at its other end, or valving end 104, is slidably carried by arm 98, as is best shown in FIG. 2. More specifically, arm 98 includes oppositely disposed valving faces 108 and 110, separated by a gap or space 112 in which plate 100 is slidably received. Air inlet and outlet means 114 and 116 are associated with valve faces 108 and 110, respectively whereby a stream of air 118, issuing from a second constant pressure source (not shown), is caused to flow across gap 112. Airstream 118 thereafter enters air outlet means 108 which connects into, or can comprise tubing 14, and is thereby directed into bubble 16, as is best shown in FIG. 1.

Figure 6:
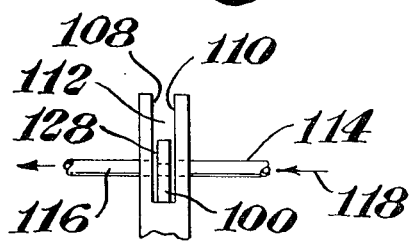
FIG. 6 is a fragmentary enlarged elevational view of the valving portion of FIG. 3 with parts broken away to illustrate the various relationships between the components forming such a valving portion.
Figure 7:
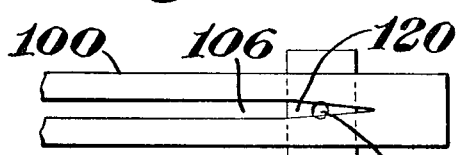
FIG. 7 is a view like FIG. 6 only showing a change in the relative positioning of such components.
Figure 8:
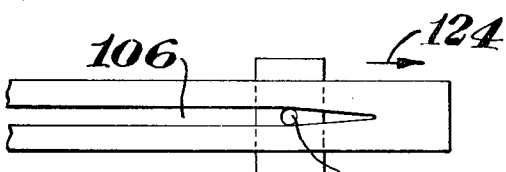
FIG. 8 is a view like FIG. 6 showing yet another such change.

Control of stream 118 is obtained by an elongated aperture or port means 106 having a tapered end 120 and defined in the valving end 104 of plate 100 (see FIG. 6). Port means 106 is alignable with stream 118 to various degrees, responsive to the movement of plate 100 in gap 112. The range or degree of alignment can vary from a partial blocking effect on stream 118, as shown in FIG. 6, to total blocking or substantially free flow conditions, as shown in FIGS. 7 and 8, respectively.

START-UP

The initial setting of device 24 involves an adjustment to the length Y of valve plate 100, by means of couplings 122, such that tapered end 120 of part means 106 is aligned between air inlet and outlet means 108 and 110 (i.e., the partial blocking position). Reeds 42 and 44 are biased upwardly into light engagement with upper contact means 50 and 54, respectively, and jets 39 and 41 adjusted such that the "flow force" impinging upon reeds 42 and 44 causes the switches to assume a "-neutral" position between the upper and lower contact means, as is shown in FIG. 2. The first constant pressure source feeding air jets 39 and 41 can be set relatively low (i.e., at about 1 p.s.i.g.). In such low pressure operations, relatively thin gauge willowylike reeds 42 and 44 are employed of a variety highly "sensitive" to the flow or currents of jets 39 and 41. For example, reeds of thicknesses in the range of about 0.005 inches and formed of springly metal alloys such as steel alloys have proved satisfactory for use in such low pressure operations or sources feeding jets 39 and 41.

Normally, an auxiliary air supply (not shown) is employed to initially "blow-up" or inflate bubble 16. The initial setting of the second constant pressure (not shown) is most readily determined by experience using various settings on a trail and error basis. Normally, an initial setting in the range of between 1 to 4 p.s.i.g. will be appropriate in extruding, for example, 16-inch layflat width tubing of between 2 to 5 mils in thickness.

OPERATION

Any increase or decrease in the layflat width of film 18 occasions an increased or decreased blocking effect or impedance on jets 39 and 41 by edges 30 and 32, respectively.

The degree of flow change required to move the switches from the neutral position to contact can be adjusted, as for example, by employing reeds of various resiliency, or varying the distance between the nozzles and the reed. This, in turn, will determine the film width tolerance that will be allowed during film manufacture.

Outside such a range of tolerance, reed switches will move upwardly or downwardly a sufficient measure to engage upper contacts 50 and 54 in response to an increased blocking effect (film too wide), or downwardly to engage lower contacts 52 and 56 in response to a decreased blocking effect (film too narrow), thereby activating control boxes 62 and 64. Boxes 62 and 64, in turn, respond with the appropriate power and phase signal to drive servomotors 66 and 68 which, through pinion gears 70 and 72 and rack gears 74 and 76, move edge followers 26 and 28 closer together or further apart corresponding to an increase or decrease in film width.

In the former instance, a decrease in film width, valving end 104 of plate 100 is caused to move to the right, as denoted by arrow 124 in FIG. 8, whereby the flow of stream 118 across gap 112 passes through a relatively wider region of port means 106, and a proportionately greater amount of air is permitted to enter bubble 16. As the bubble expands, due to the increased flow of stream 118, the process is reversed, and the system activated to move followers 26 and 28 further apart, and valving end 104 to the left as denoted by arrow 126 in FIG. 7, until such expansion has returned the bubble to normal size. In response to decreased flow (film too wide) the servomotors would initially activate to carry the followers 26 and 28 further apart, and then closer together, as the bubble is brought back down to its proper size.

Figure 3:
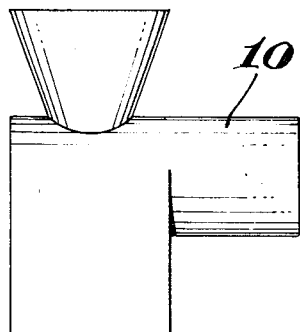
FIG. 3 is a fragmentary enlarged end view of a part of the valving portion of the device of FIG. 2.

Edge followers 26 and 28 act independently of each other through the use of separate gears, servomotors, jets, and the like as described above, and with each jet being responsive only to the respective film edge on which it is trained. Accordingly, where the film meanders to the left or the right, and without changing size, no relative movement between the followers would register and the device 24 is thus not affected by film sway. Where the film increases in size either to the left or the right, but not in both directions, the follower associated with such edge shift or change would independently activate the system and thereby bring it back to static running conditions. Rapid response to overinflation of bubble 16 is assisted by backflow which can exit from the terminus 128 of air outlet means 116 as denoted in FIG. 3.

Flapping of film edges 30 and 32 can be a problem easily licked by employing device 24 between sets of relatively closely spaced rollers which would hold the edges 30 and 32 of the moving film 16 sufficiently steady for the operations of device 24.

The above description of the invention along with the accompanying drawings are for the purpose of illustrating the preferred embodiment, and it is to be understood that changes may be made in the structural details and application of same without departing from the scope of this invention. For example, the edge finder system and valve mechanism comprising device 24 would be useful in controlling and metering airflow in any operation where such flow must be regulated in accordance with the edge positions or the like of the article being fabricated.

We claim:

1. A device for automatically controlling the width of moving film extruded from an annular die in the form of a tubular envelope, said device comprising in combination: a means movable transversely of said film for sensing deviations in film width, a valve mechanism responsive to said sensing means for controllably feeding air into said tubular envelope for increasing or decreasing its size an amount appropriate to correct said deviations, said mechanism including means adapted to direct a stream of gas into said tubular film, said directing means defining a region across which said stream flows, flow block means disposed in said region and being movable relative thereto, means to translate movement of said sensing means to relative movement between said flow block means and said region for varying the blocking effect on said stream responsive to film width deviations detected by said sensing means, said sensing means comprising first and second film followers including means to move said followers to independently follow opposite longitudinally extending portions of said film, respectively, said translating means comprising said flow block means being moveably associated with said first follower, said region being moveably associated with said second follower, whereby relative movement between said followers varies the positioning between said flow block means and said region to automatically regulate said stream.

* * * * *